April 19, 1932.　　　K. NAKASHIMA　　　1,854,855

PIPE JOINT

Filed Feb. 21, 1931

INVENTOR.
Kisaburo Nakashima
BY
ATTORNEY.

Patented Apr. 19, 1932

1,854,855

UNITED STATES PATENT OFFICE

KISABURO NAKASHIMA, OF KOISHIKAWA-KU, TOKYO-SHI, JAPAN

PIPE JOINT

Application filed February 21, 1931, Serial No. 517,615, and in Japan March 30, 1930.

This invention relates to improvements in pipe joints of the kind wherein a tight joint between an elastic packing ring applied to the seam between coupled pipes to embrace the parts and the body of the pipes is insured by the pressure of fluid in the pipes, and has for its object to provide an improved pipe joint of the kind above referred to.

In some well known constructions of the pipe joint of the said kind, the application is less easy and the elastic packing ring is liable to be more or less damaged upon inserting therein the pipes to be coupled, or relative movement between the packing ring and the pipes, so that its tight fit with the pipes is not insured, and dust or other foreign matter may deposit on its inner side, the inner side being directly exposed to fluid in the pipes.

In the pipe joint according to the invention, the elastic packing ring is made in a tube form and its inner side communicates with fluid in the pipes through an opening, so that the application is easy and dust or other foreign matter will not deposit on inner side of the elastic packing ring.

In the accompanying drawings.

Figure 1:
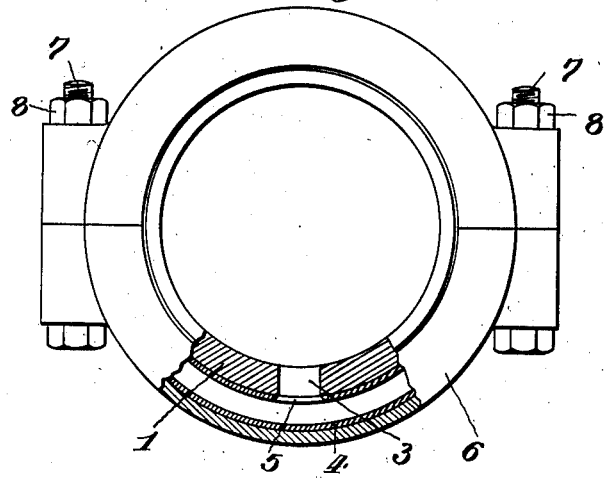
Fig. 1 is a side view, partly in section, of the pipe joint embodying the invention.
Figure 2:
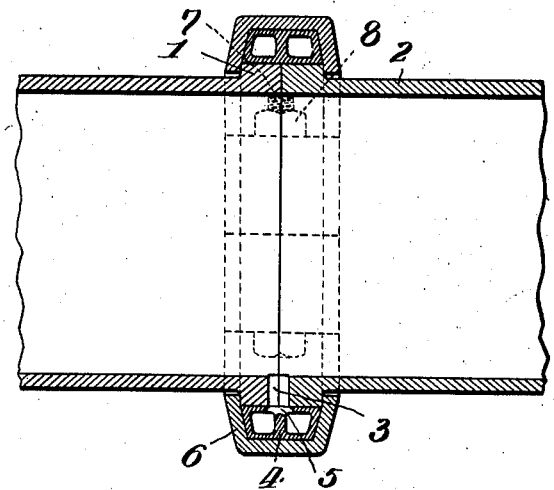
Fig. 2 is a vertical section thereof.

Referring to the drawings, pipes to be coupled 1 and 2 are abutted end to end. 3 is an opening formed at jointing seam of the pipes, one half of which is formed at the end of the pipe 1 and other half at the end of the pipe 2. An elastic packing ring 4 substantially of a tube form with two bores is put on the seam of the pipes to extend to both sides of said seam through a suitable distance to embrace the parts. The packing ring is provided with an opening 5 for making a communication between its bores and the inner side of the pipes through the opening 3.

The elastic packing ring is tightly grasped by means of a clamp 6 which may be of two or more sections adapted to be secured by means of bolts 7 and nut 8 as shown.

With this construction, pressure in the tubes will be transmitted to air in inside of the packing ring through openings 3 and 5, whereby the packing ring tends to be expanded and is tightly pressed against the outer walls adjacent the seam of the coupled pipes to insure a tight joint between the packing ring and the body of the coupled pipes.

Having now particularly described and ascertained the nature of my said invention and in what manner the same is to be performed, I claim:

1. A pipe joint comprising an elastic packing ring substantially of a tube form with an opening and adapted to embrace over a seam of coupled pipes abutted end to end and a clamp for grasping the packing ring, said opening being adapted to communicate with another opening formed at the seam of the coupled pipes and consequently with inside of the pipes, as shown and described.

2. A pipe joint comprising an elastic packing ring having substantially the form of a double tube with a central longitudinal partition therein, means defining an opening for the said tube common to the two portions divided by the partition, the said packing ring embracing the seam of coupled pipes abutting end to end, and a clamp fitting about and grasping the packing ring, an opening being formed at the seam of the coupled pipes and consequently with the interior of the pipes, whereby the pressure occasioned by the fluid flowing through the pipes will flow through the said tubular portions and will insure a tight seal.

In testimony whereof I affix my signature.

KISABURO NAKASHIMA.